UNITED STATES PATENT OFFICE.

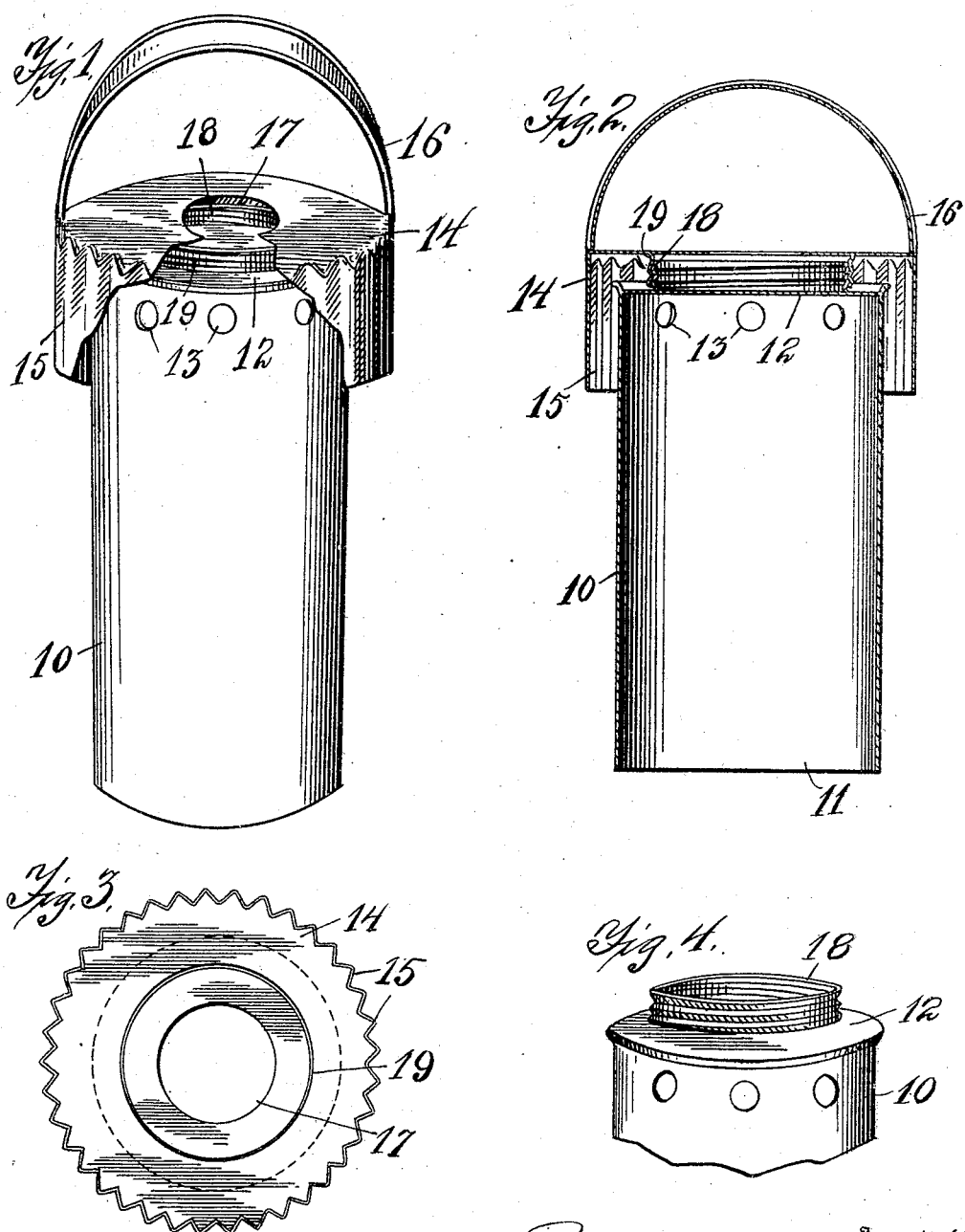

ROSE M. SPENCE AND EDWIN J. SPENCE, OF FALCONER, NEW YORK.

COMBINED VEGETABLE AND PASTRY CUTTER.

944,700.

Specification of Letters Patent.

Patented Dec. 28, 1909.

Application filed June 26, 1909. Serial No. 504,467.

*To all whom it may concern:*

Be it known that we, ROSE M. SPENCE and EDWIN J. SPENCE, citizens of the United States, residents of Falconer, in the county of Chautauqua and State of New York, have invented new and useful Improvements in Combined Vegetable and Pastry Cutters, of which the following, taken in connection with the accompanying drawings, is a full, clear, and exact description.

The invention relates to cylindrical vegetable and pastry cutters; and the object of the invention is to provide a shallow cylindrical cutter for pastry and a deep cylindrical cutter for vegetables combined in such a manner that the shallow cutter forms a shield or protection for the hand from the steam and hot air in cutting hot vegetables with the vegetable cutter.

It is obvious that either a vegetable or pastry cutter should have an opening in the upper portion or the suction would cause the material operated upon to stick within the cutter and clog its use. In a vegetable cutter also such openings are necessary to allow the escape of the steam and hot air from the interior of the cutter. In the present construction the two cutters are combined in such a manner that they may be easily taken apart and the pastry cutter used by itself, but when united the pastry cutter forms a complete shield for the hand from the holes in the upper part of the vegetable cutter, and the handle for the pastry cutter also acts as a handle for the vegetable cutter, so that only one handle is necessary; and the invention consists in the construction and arrangement of the parts as described in this specification, shown in the drawings, and pointed out in the claims.

In the drawings, Figure 1 is a perspective view of the combined cutters, the pastry cutter being broken away to show the manner of attaching the same to the vegetable cutter. Fig. 2 is a vertical sectional view of the combined cutters. Fig. 3 is a plan view of the under side of the pastry cutter showing the screw ring attached within the pastry cutter; and Fig. 4 is a perspective view of the upper end of the vegetable cutter showing the threaded rim on the upper end of the vegetable cutter which screws into the screw ring within the pastry cutter to unite the two.

Similar numerals refer to corresponding parts in the several views.

The numeral 10 indicates the vegetable cutter which is made in the form of an elongated tube or cylinder, open at its lower end 11 and closed at its upper end 12 with the exception of a row of holes 13 around the same near the closed upper end 12, said holes 13 being preferably through the cylindrical sides near said upper end 12, the whole forming an inverted deep cup-shaped body or cutting member when in position for use.

The numeral 14 indicates the pastry cutter which is made in the form of a shallow cup for a cutting member, with sides that are preferably fluted as at 15 in order to make use of the extra stock around the edge in stamping the cup-shaped cutter 14 out of a flat disk as well as the ornamental design. A handle 16 is attached to the opposite sides of the cutter 14 and a hole 17 is provided in the top of the cutter.

In order to attach the cutters to one another in such a manner as that one handle shall do for both of the cutters and also that the shallow pastry cutter 14 shall extend down over the upper end of cutter 10 and cover the holes 13 around the outer upper edge, a threaded ring 18 is attached to the upper end 12 of vegetable cutter 10 and a similar threaded ring 19 is attached within cutter 14 to the under side of the top and around hole 17, the threaded ring 19 being made to fit over the ring 18 so that the two shallow rings will screw on to one another with a coarse thread by simply placing the two together and turning the one while holding the other cutter firmly in the hand. By this arrangement it is apparent that the handle 16 may be grasped and the combined cutters may be used as a vegetable cutter, the holes 13 allowing free egress for the hot air and steam, yet being shut entirely away from the hand of the operator, the steam being turned downward within the pastry cutter and the screw rings 18 and 19 close the space around hole 17 so that no hot air or steam can find exit through said holes. It is also obvious that the pastry cutter 14 may be separated from the vegetable cutter 10 by simply turning the same off from said vegetable cutter and that the pastry cutter is then in perfect form for cutting cookies, biscuits, and other forms of pastry.

We claim as new:

1. A combined vegetable and pastry cutter consisting of a cylindrical cutting member closed at one end and having holes in the cylindrical sides near said closed end, and a larger closed cylindrical member attached to and extending over the holes of the first cylindrical member sufficiently to protect the hand of the user.

2. A combined vegetable and pastry cutter consisting of a cylindrical cutting member closed at one end and having holes in the cylindrical sides near said closed end, a larger closed cylindrical cutting member removably attached to the said first cylindrical member, said larger cylindrical member extending a sufficient distance over the first cylindrical member to cover the holes in the first cylindrical member and protect the hand of the user.

3. A combined vegetable and pastry cutter consisting of a deep cup-shaped body having a threaded portion on its closed end; a larger shallow cup-shaped body having a threaded portion on its under side to fit the threaded portion of said deep cup-shaped body, a handle on said shallow cup-shaped body, said deep cup-shaped body having openings near its closed upper end and said shallow cup-shaped body having an opening in its closed end.

4. A device of the character described comprising an elongated cylindrical body open at one end and closed at the other, said body having a threaded ring on its closed end and provided with openings near said closed end, a second shorter cylindrical body having a corresponding threaded ring on its under side to screw on to said first ring, said shorter body having a suitable handle and larger circumference than said elongated cylindrical body to shut over the same when said bodies are united.

In testimony whereof we have signed our names to this specification in the presence of two subscribing witnesses.

ROSE M. SPENCE.
EDWIN J. SPENCE.

Witnesses:
I. A. ELLSWORTH,
A. L. FURLOW.